US006615203B1

(12) United States Patent
Lin et al.

(10) Patent No.: US 6,615,203 B1
(45) Date of Patent: Sep. 2, 2003

(54) METHOD, COMPUTER PROGRAM PRODUCT, AND SYSTEM FOR PUSHDOWN ANALYSIS DURING QUERY PLAN GENERATION

(75) Inventors: Eileen Tien Lin, San Jose, CA (US); Tina Louise Mukai, San Jose, CA (US); Shivakumar Venkataraman, Sunnyvale, CA (US); Tian Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,560

(22) Filed: Dec. 17, 1999

(51) Int. Cl.[7] .............................................. G06F 17/30
(52) U.S. Cl. ........................................................ 707/3
(58) Field of Search ................................ 707/2, 3, 6, 7, 707/100, 101, 102

(56) References Cited

U.S. PATENT DOCUMENTS

| 5,864,840 A | * | 1/1999 | Leung et al. | 707/10 |
| 6,134,540 A | * | 10/2000 | Carey et al. | 707/2 |
| 6,226,637 B1 | * | 5/2001 | Carey et al. | 707/4 |
| 6,285,997 B1 | * | 9/2001 | Carey et al. | 707/4 |

OTHER PUBLICATIONS

Hamid Pirahesh et al., "Extensible/Rule Base Query Rewrite Optimization in Starburst", Conference Proceedings for SIGMOD 1992, pp. 39–48.

Peter Gassner et al., "Query Optimization in the IBM DB2 Family" Data Engineering Bulletin 16 (4): 0–13 (1994).

Oracle 8i™ Distributed Data Access and Oracle Transparent Gateway®, Feb. 1999 pp. 1–4.

EDA Server, http://www.ibi.com/products/eda/server. htm.

Oracle 8i Distributed Database Systems Release 8.1.5, A67784–01, http://technet.oracle.com/doc/server.815/a67784/ds_ch1.htm.

Optimizing Distributed Queries, SQL Server 7.0 Query Processor White Paper, Microsoft®, mk:@MSITStore:C:/TEMP/SOLBOL.CHM::/html/tun 1 103.htm.

Laura M. Haas, et al., "Optimizing Queries across Diverse Data Sources," IBM Almaden Research Center, VLDB 1997 Conference, Athens, Greece, Feb. 21, 1997.

Weimin Du, et al., "Query Optimization in Heterogeneous DBMS," Proceedings of the 18th VLDB Conference, Vancouver, British Columbia, Canada 1992, pp. 277–291.

Fernando de Ferreira Rezende, "The Heterogeneity Problem and Middleware Technology: Experiences with and Performance of Database Gateways," Proceedings of the 24th VLDB Conference, New York, 1998.

Oracle7 Server Concepts Manual, http://teku.pspt.fi/~jkajala/oradoc/DOC/server/doc//SCN73/ch13.htm.

* cited by examiner

Primary Examiner—Safet Metjahic
Assistant Examiner—Sana Al-hashemi
(74) Attorney, Agent, or Firm—Sughrue Mion, PLLC

(57) ABSTRACT

A method, computer product, and system for pushdown analysis during query plan generation is provided. Rather than do pushdown analysis for portions of a query that are query execution plan independent, the present invention provides pushdown analysis for features of a query that are plan dependent. This is done by evaluating a portion of the query plan for pushdownability to a remote database system; and if pushdownable to the remote database system, generating cost parameters for the portion of the plan if executed at a local database system and if executed at the remote database system. With both sets of cost parameters, the query optimizer has added information on which to select an optimal query plan.

22 Claims, 9 Drawing Sheets

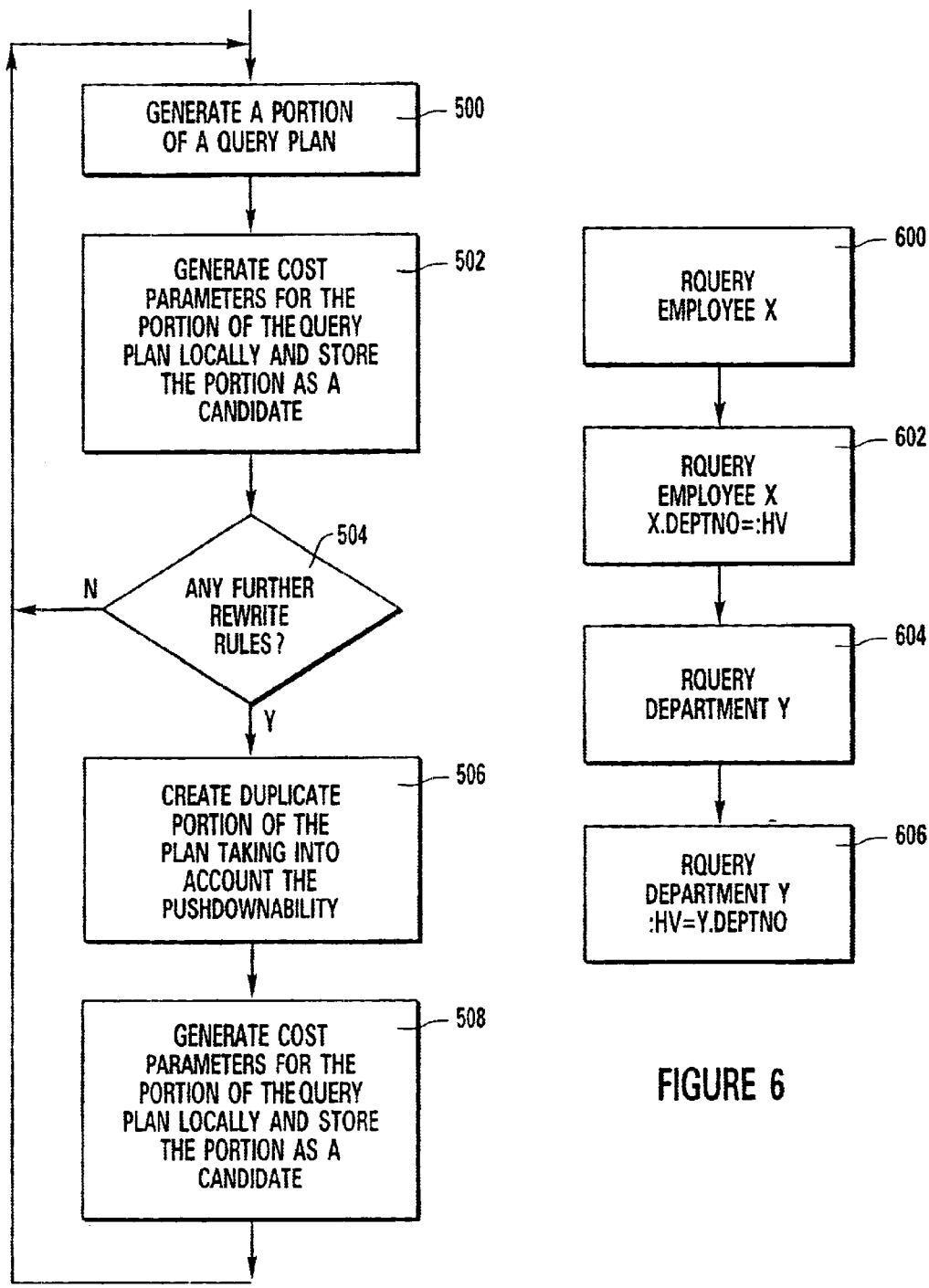

METHOD, COMPUTER PROGRAM PRODUCT, AND SYSTEM FOR PUSHDOWN ANALYSIS DURING QUERY PLAN GENERATION

CROSS-REFERENCE TO RELATED APPLICATIONS

This application is related to the following co-pending and commonly assigned application, which application is incorporated by reference herein:

U.S. Pat. No. 6,526,403, "Method, Computer Program Product, and System for Rewriting Database Queries in a Heterogeneous Environment," filed on the same date herewith, by Tian Zhang, Eileen Lin, Shivakumar Venkataraman, and Tina Mukai, issued Feb. 25, 2003.

BACKGROUND OF THE INVENTION

1. Field of the Invention

The present invention relates to the processing and optimization of database queries for increased execution performance. More particularly, the present invention relates to query optimization in a heterogeneous database environment where a local database system appears and responds to clients as if having at least some tables locally that are actually on remote database systems.

2. Present State of the Art

An important component of the query planning and optimization process in a heterogeneous database system is to determine the portions of the heterogeneous query that can be executed at the remote database system, i.e., pushdown analysis. Accurate pushdown analysis is important for heterogeneous query optimization because of the need to clearly identify the portions of the query that can be executed at the remote database systems in order to generate a complete query execution plan.

An optimizer will consider many alternatives as it generates query plans. Generally speaking, the more alternatives for an optimizer to explore, the better chances of arriving at the most optimal final plan. In the heterogeneous database environment, remotely executeable or "pushdownable" queries or portions of queries are in many instances very efficient and hence make good alternatives for an optimizer to consider.

Conservative pushdown analysis could result in query plans that are not optimal since potential alternatives are never considered by a query optimizer. When there is incorrect pushdown analysis, an optimizer could generate query plans that are infeasible due to the capability limitations of the remote database system.

In some heterogeneous database systems, the portions of the heterogeneous query that can be executed at the remote database system is determined by a pushdown analysis that is typically effective only for plan independent features of the query. In other words, only those features of the query that would always be pushdownable regardless of how the optimizer generated the query plan would in fact be considered pushed down.

This type pushdown analysis is performed before query optimization, and is not associated with the plan enumeration and evaluation. This approach of checking and indicating various portions of the query that can be executed at the remote database system cannot always accurately capture the portions of the query that are really pushdownable because some of the pushdownabilities are dependent upon how the query is planned for execution. What is needed are better ways to capture pushdownable portions of queries in a heterogeneous database environment.

SUMMARY OF THE INVENTION

One aspect of the present invention provides a way of increasing the amount of pushdownability by doing pushdown analysis during query plan generation that takes into account the actual query plan in determining what portions of a query may or may not be pushdownable. This in turn may lead to more optimal query execution plans since the optimizer may consider more alternatives.

Additional aspects and benefits of the invention will be set forth in the description that follows, and in part will be obvious from the description, or may be learned by the practice of the invention. The benefits of the invention may be realized and obtained by the combinations particularly pointed out in the appended claims.

In accordance with the invention as embodied and broadly described herein, a method, computer product, and system for pushdown analysis during query plan generation is provided.

Essentially, for each portion of the query plan that is generated by an optimizer, a test is made to see whether that portion of the query plan is pushdownable or not. If so, that portion of the query plan is "duplicated." The original portion is processed and cost parameters are generated from the perspective of it being executed locally.

The duplicated portion is also processed but the cost parameters are generated from the perspective of it being pushed down and executed at the remote database system. The optimizer now has an extra alternative to evaluate as it continues plan generation and enumeration.

The optimizer considers the various permutations of the tables and subquery results to be combined along with the predicates that can be applied on the result. This allows for those pushdownabilities that are plan dependent to be evaluated under the specific context being planned.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope.

FIG. 5 is a flowchart illustrating some of the processing steps taken in the Optimizer phase shown in FIG. 3 in order to generate a greater number of alternatives for the Optimizer phase to use that takes into account pushdownability during query plan enumeration;

FIG. 6 is a logical diagram representing a set of portions of a query that may be generated by the Optimizer phase shown in FIG. 3;

DETAILED DESCRIPTION OF THE INVENTION

Figure 1:
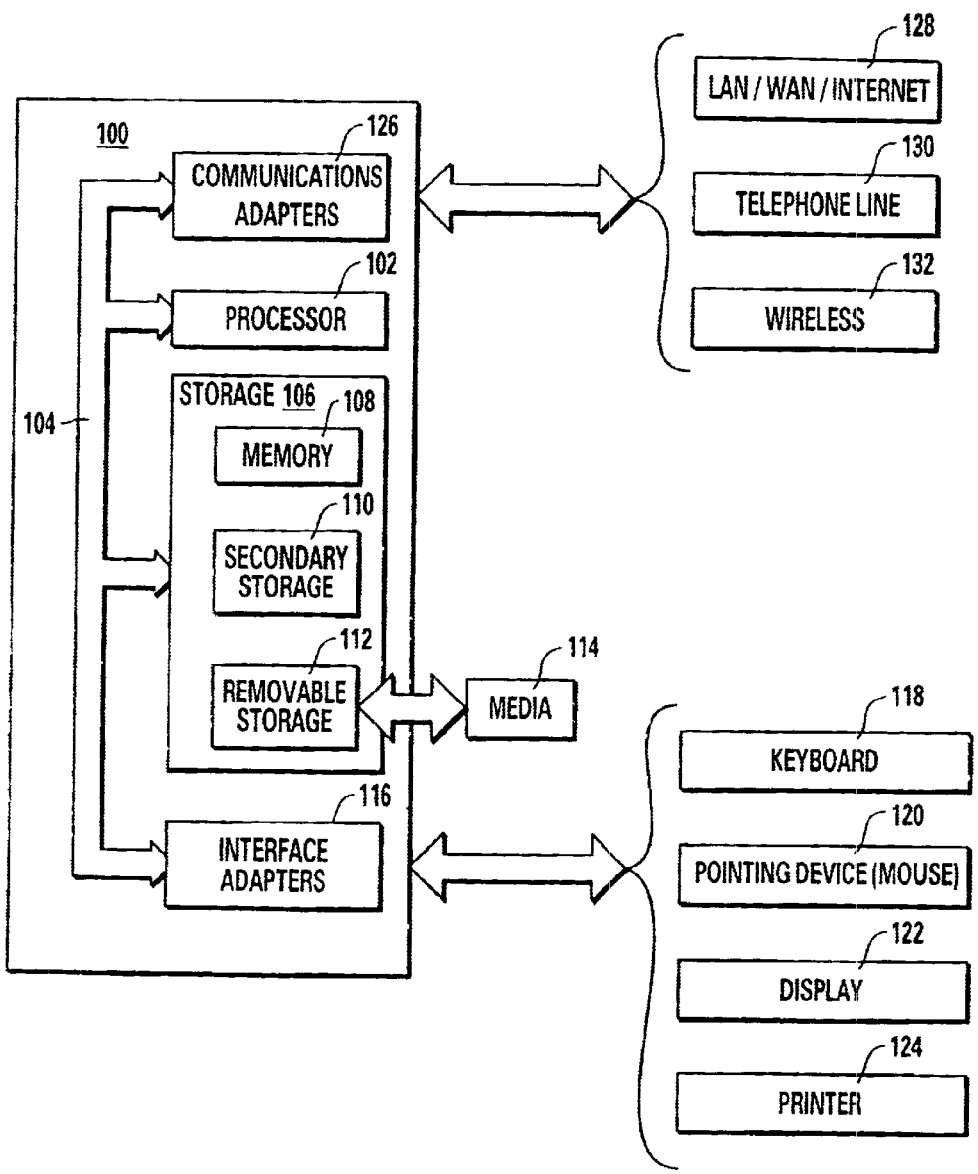
FIG. 1 is a block diagram of a computing device, such as a workstation, wherein the present invention may be practiced.

FIG. 1 is a block diagram of a computing device, such as a workstation, wherein the present invention may be practiced. The environment of FIG. 1 comprises a single representative computing device 100, such as a personal computer, workstation, hand-held computer, information appliance, etc., including related peripheral devices. The workstation 100 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 10 may have multiple memories (e.g., RAM and ROM), secondary storage devices, and removable storage devices (e.g., floppy drive and CD ROM drive).

The computing device 100 typically includes a user interface adapter 116 that connect the microprocessor 102 via the bus 104 to one or more interface devices, such as keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 10 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

As will be understood by one of ordinary skill in the art, computer programs such as that described herein are typically distributed as part of a computer program product that has a computer useable media or medium containing the program code. Therefore, "media", "medium", "computer useable medium", or "computer useable media", as used herein, may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered a computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "on" a medium is intended to encompass the above and all equivalent ways in which the instructions or software is associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Figure 2:
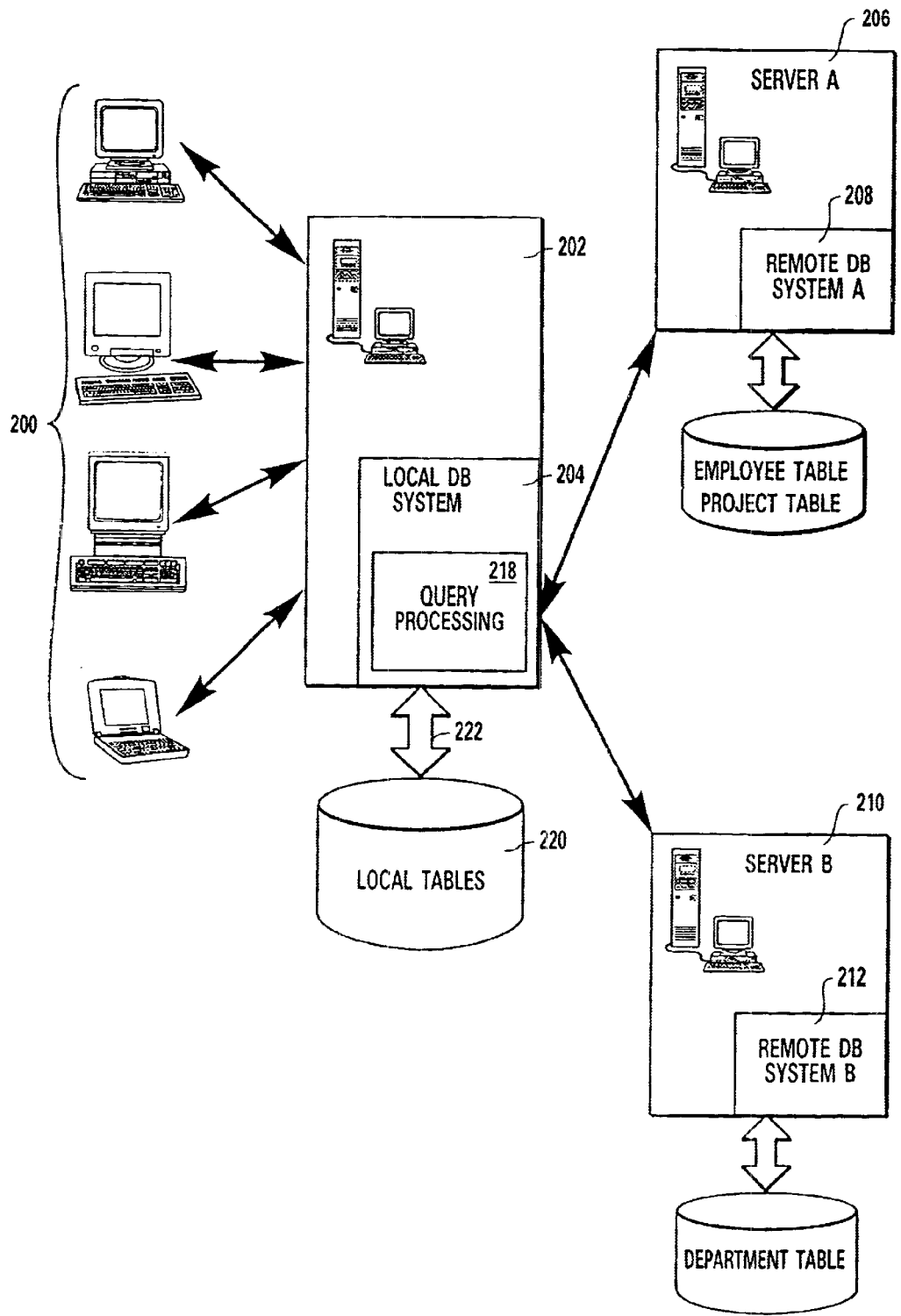
FIG. 2 is a logical diagram of a database environment where a number of clients send database queries to a local server running a heterogeneous database system therein that in turn may contact remote database systems of different types to service the query.

Referring now to FIG. 2, a heterogeneous database environment is presented. Typically, a number of clients 200 communicate with a local server 202, or other computing device, that has running thereon a local database system 204 that is able to respond to queries across multiple database systems, such as DB2 DataJoiner available from IBM.

The local database system 204 will communicate with one or more remote database systems having remote tables thereon. Essentially, the local database system 204 makes it appear to the clients 200 that all the remote tables (e.g., employee table, project table, department table, etc.) are local tables and can be manipulated as if local using the native query language, such as SQL statements.

For example, in FIG. 2, Server A 206 is running remote database system A 208 that will have access to an Employee table and a Project table, and Server B 210 is running remote database system B 212 that will have access to a Department table. Any of the clients 200 can send queries to the local database system 204 that will be handled by a query processing component 218 where all of the remote tables will appear to the clients 200 as local tables and will function as such. The local database system 204 will handle all of the operations, such as making remote queries to acquire data, without the clients 200 even being aware of the existence of the remote database systems.

While the remote database systems A 208 and B 212 may be of the same type as the local database system 204, this is not required. Because the remote systems may be of different types (e.g., flat file, hierarchal, different "dialects" of SQL, etc.) available from different manufacturers, it is said to be a heterogeneous environment. For purposes of the examples that follow, we will assume that remote database systems are different versions of SQL databases from different manufacturers, such as Oracle, Sybase, Informix, Microsoft, etc.

Figure 3:
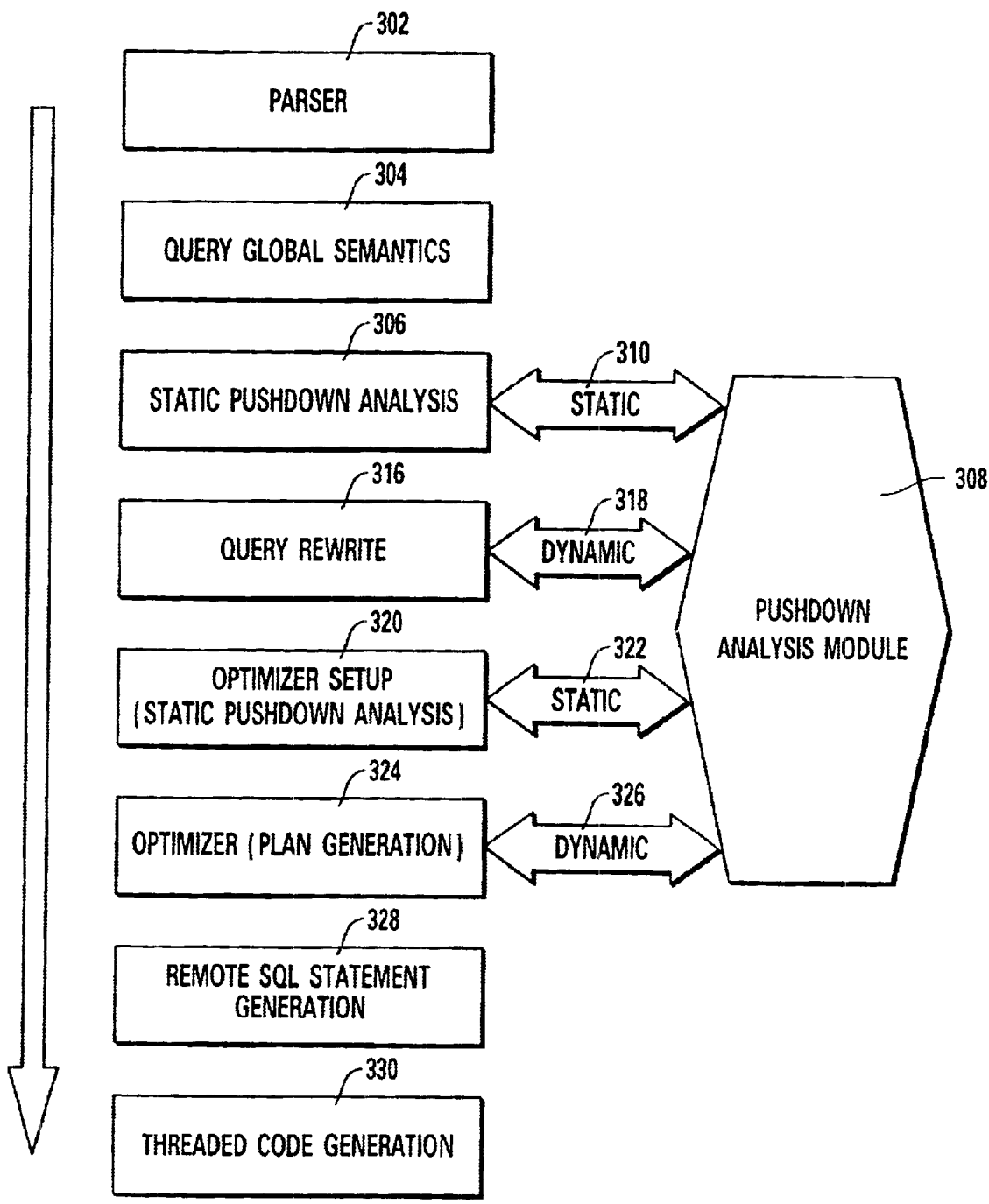
FIG. 3 is a logical diagram showing the software phases used for query processing (i.e., query compilation) of one embodiment of the present invention.

Referring now to FIG. 3, the flow of query processing (i.e., query compilation) of incoming queries of one embodiment of the present invention will now be explained. As used herein, the term "query processing" refers to processing necessary to prepare a query for execution and is alternatively referred to as query compilation. Each phase of processing will operate successively as shown by the directional arrow 300 and may use common modules, etc. A brief description of these phases will be described here and a more complete description for many of the phases may be found in "Extensible/Rule Base Query Rewrite Optimization in Starburst" by Hamid Pirahesh et. al as published in conference proceedings for SIGMOD 1992 pages 39–48 and "Query Optimization in the IBM DB2 Family" by Peter Gassner et. al as published in Data Engineering Bulletin 16(4): 4–18 (1993); both of which are hereby incorporated by reference in their entirety.

Initially, the Parser phase 302 analyzes the original SQL statement received from a one of the clients 200 and constructs an internal Query Graph Model (QGM) that will be used for further processing. The details of the structure of the QGM can be found in Pirahesh at 40–41 (cited previously). Essentially, the QGM is a way of representing a query in an internal data structure. Throughout this application and in the claims appended hereto, reference will be made to rewriting the query or otherwise manipulating the query. These references will apply equally to the actual query text or any internal representation of the query, such as the QGM, unless otherwise specified.

Next, the Query Global Semantics phase 304 performs checks for constraints, triggers, etc. and transforms them into the corresponding update, delete, and insert operations.

The Static Pushdown Analysis phase 306 will traverse the QGM and invoke a Pushdown Analysis module 308 as indicated by arrow 310. The Pushdown Analysis module 308 is adapted to analyzing portions of a query and makes reference to locally stored information accessible by the local database system 204 regarding the capabilities of the remote database systems. Essentially, the Pushdown Analysis module 308 returns whether or not the portion is pushdownable and if so what those pushdownable entities would be (i.e., host variable support, expressions, predicates, SQL operations, etc. at the remote system).

As the Static Pushdown Analysis phase 306 traverses the QGM, it will call the code in the Pushdown Analysis module 308 in a "static" mode. As used herein, the term "static" refers to situations where reference to the Pushdown Analysis module 308 can be predetermined before query processing regardless of the query or any other contextual information, while the term "dynamic" refers to situations where reference to the Pushdown Analysis module 308 occurs depending on the state of query processing and is determined by the particular query being processed or other context sensitive situation. As will be explained hereafter in more detail, two occasions where dynamic pushdown analysis occurs is during the Query Rewrite phase 316 depending on the query and the query rewrite rule being applied and the Optimizer phase 324 depending on which plan or portion of a plan is being generated.

The Query Rewrite phase 316 applies heuristic rules to rewrite the QGM structure into a more efficient form. The more efficient form is generally based on the structure of SQL itself and has previously been done in a vacuum without considering pushdownability factors that are important to performance in the heterogeneous database environment.

As applied in database systems generally, queries are rewritten using an extendible rule-based architecture. This architecture consists of a suite of heuristic rules and a rule engine for selecting which rewrite rules to apply. Each rule is organized into a CONDITION portion that must be met in the query or a portion thereof and an ACTION part that is executed. Details of such an architecture can be found in "Extensible/Rule Based Query Rewrite Optimization in Starburst" by Hamid Pirahesh, et al., cited previously.

For example, given a complex query, the rule engine can use a simple sequential strategy to select the query rewrite rules and then apply them, one by one, to the query. Once a rule is selected, the CONDITION part is tested, if the result of the test turns out to be true, then the ACTION part is executed. As explained previously, the ACTION part rewrites the query into the functionally equivalent but more efficient form.

Some examples of the query rewrite rules include rules for: removing redundant predicates, removing redundant distinct requirements of query results, transforming a particular subquery (or portion of a query) into a join operation, transforming an intersection into join, transforming outer join into join, transforming OR predicate into IN predicate, transforming IN predicate into join, eager predicate evaluation, eager group by evaluation, etc. Note that the purpose of Query Rewrite rules is to allow the Optimizer phase 324 (explained hereafter) to generate the optimal query plan.

One aspect of the present invention combines the traditional query rewrite rules with the heterogeneous database system environment. As a general practice, system performance can be enhanced when as much of the query that is pushdownable to a remote database system is considered during the Optimizer phase 324 explained hereafter. This allows the Optimizer phase 324 to consider pushing down the portion of the query or executing it locally and making the decision within context as to which will be optimal. In other word and generally speaking, the more alternatives that can be considered by the Optimizer phase 324 during plan generation the higher performing the processed query. Therefore, the impact of the "pushdownability" of the query both before and after the query rewrite is assessed and the form with the greatest pushdownability is used.

Figure 4:
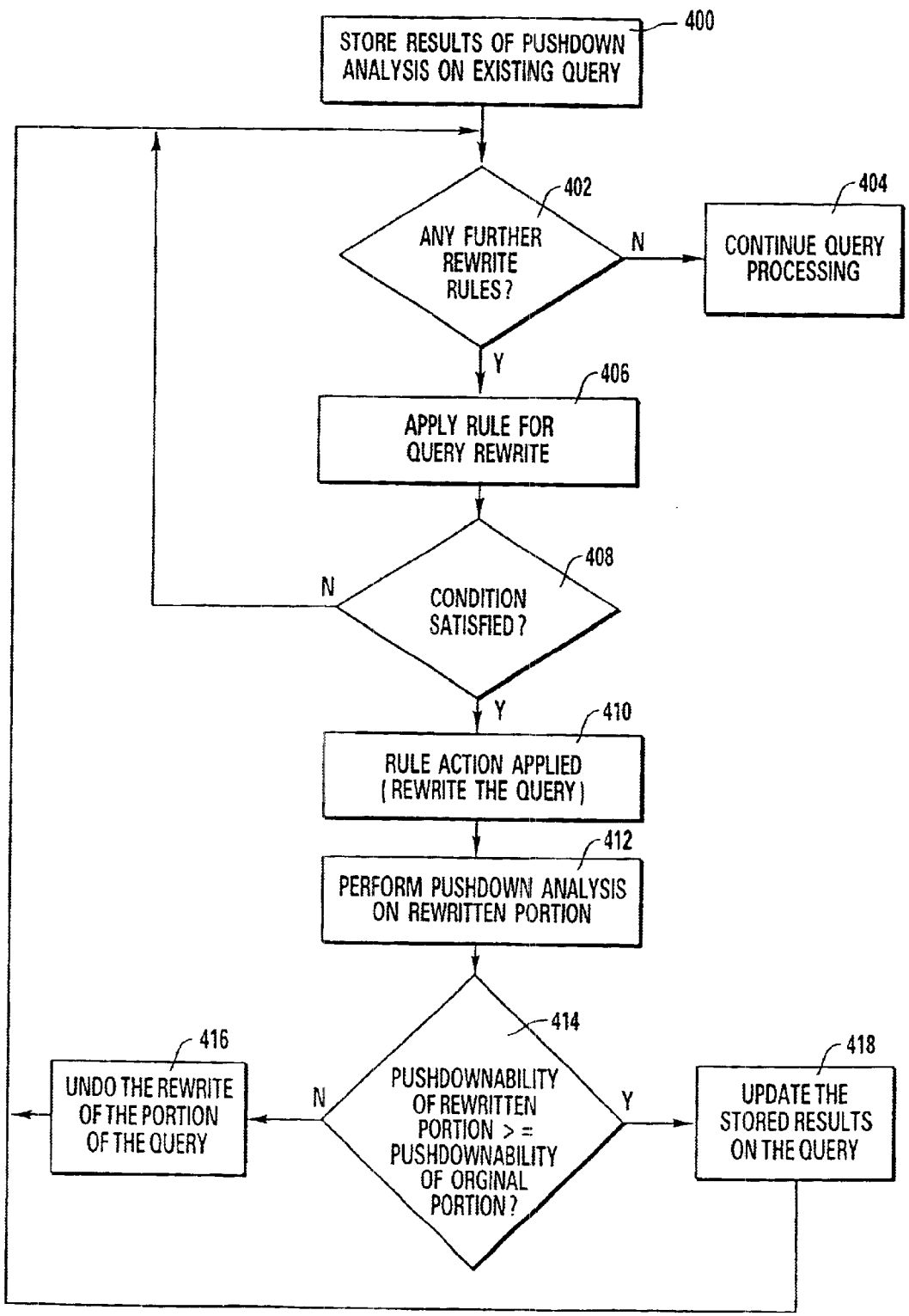
FIG 4 is a flowchart illustrating some of the processing steps taken in the Query Rewrite phase shown in FIG. 3 in order to ensure that the pushdownability of a query after application of a query rewrite rule is not decreased.

For one embodiment of the present invention, the process for handling queries needing access to remote data is detailed in the flowchart shown in FIG. 4. Naturally, those queries that need access only to local data need not go through this processing.

Initially, at step 400, the original QGM (or other representation of the query) is analyzed in its entirety for pushdownability. This is done by the Static Pushdown Analysis phase 306 as it traverses the QGM and invokes the Pushdown Analysis module 308. The results of this analysis is stored within the QGM as part of the inherent query structure and is therefore distributed throughout the query representation at the relevant portions of the query. This allows the pushdownability of a given portion of the query to be readily available.

At step 402, the availability of any query rewrite rules is determined. If none are available, query processing is continued onto the next phase of processing at step 404.

If there are query rewrite rules as determined at step 402, the, at step 406, a rule that has been selected the Query Rewrite phase 316 is applied to the query or a portion thereof. If the CONDITION of the rule is not satisfied as determined at step 408, then processing will continue to the next rule selected by the Query Rewrite phase 316 (at step 402).

If the CONDITION of the rule is satisfied at step 408, then the ACTION of the rule will be executed to rewrite the relevant portion of the query at step 410 and a pushdown analysis is performed on the newly rewritten portion of the query at step 412. This is accomplished by the Query Rewrite phase 316 invoking the code in the Pushdown Analysis module 308 as indicated by arrow 318. This invocation is done in "dynamic" mode as explained previously since it depends on progress made on the query and cannot be predetermined before the query processing.

As part of the processing done by the Pushdown Analysis module 308, note that those skilled in the art will recognize different ways of ascertaining the capabilities of a remote database system. One embodiment will access information stored in the local database system 204. Other implementations, however, may query the remote system directly.

The pushdownability results from the Pushdown Analysis module 308 for the rewritten portion of the query are compared to the pushdownability of the original portion of the query at step 414. Since the goal is to rewrite the query into a more efficient form for a heterogeneous database environment, if the pushdownability is less for the rewritten portion than as it stood originally, an UNDO operation is performed at step 416 to place the query back into its original form. An UNDO operation is added to the definition of each rule and contains instructions for reversing the ACTION portion of the rule. Note that databases in a non-heterogeneous environment would not be concerned about pushdownability and not have a need for the additional UNDO operation associated with the rule.

If the pushdownability for the rewritten portion of the query is not decreased, then the QGM is updated to reflect the new pushdown characteristics at step 418. The net effect is that as rules are applied and the pushdownability of the overall query is changed by rewriting portions of the query, a current model of the pushdown characteristics of the query is maintained.

After either performing an undo operation at step 416 or updating the QGM with the new pushdown characteristics processing continues to step 402 where a test is made to determine whether additional query rewrite rules are available for application to the query. If so, they are applied as previously explained at step 406. If not, the processing of the query continues on at step 404.

Note that it is not necessary to use QGM in order to receive the benefits of query rewrite rules that take into account pushdownability. The initial pushdownability of the query is used as a starting point (regardless of form) and as the query (in whatever form) is changed, pushdownability is taken into account in order to determine whether the changed query has decreased pushdownability than the original query. If pushdownability has not been decreased (e.g., remains the same or is more pushdownable), the change in pushdownability is recorded, and if not, the query is restored to its state before the change.

Note also one effect of the foregoing is to prioritize pushdownability over the benefits derived from the application of the rule. Overall, pushdownability will be maintained or increased regardless of whether the rule is applied and the rule will not be applied (thus foregoing the rule benefit) if pushdownability would be decreased.

In order to illustrate the effect of rewriting queries that takes into account pushdownability, a number of examples will now be explored. These examples will make use of the following table definitions: Employee(empname, empno, deptno) representing an employee having a name, a number, and an associated department number and further having a unique index on empno; Project(prjname, projno, deptno) representing a project having a name, a number, and an associated department number; and Department(deptname, deptno, mgrno) representing a department having a name, a number, and an associated manager number. Unless otherwise specified, the Employee table and Project table will be on remote database system A 208 on server A 206, and the Department table will be on remote database system B 212 on server B 210.

Transforming IN predicate into JOIN. This example illustrates when the UNDO operation would be applied based upon the rewritten portion of the query having less pushdownability than the original portion. Given a query determines employees whose empno is in (100000, 200000) as illustrated in the SQL query below:

SELECT *
  FROM Employee x
  WHERE x.empno IN (100000, 200000)

The "Transforming IN predicate into JOIN" query rewrite rule has an ACTION to rewrite the query shown above to the following query shown below:

SELECT *
  FROM Employee x, table_function(100000,200000) as y(empno)
  WHERE x.empno=y.empno The transformation of the IN to a JOIN gives the query optimizer the ability to order the table_function y and the Employee table x as the outer or the inner of the query plan that is produced. For example, following are two available alternatives for the JOIN: (1) to choose x as outer, y as inner, and for each row of x, use scan to get matching rows from y; and (2) to choose y as outer, x as inner, and for each row of y, use index scan on Employee(empno) to get matching rows from x (because of the unique index, empno, on Employee).

However, suppose that for remote database system A 208 containing the Employee table, we cannot generate a SQL statement to represent the table_function(100000, 200000). Therefore, the query with the IN predicate that could have been evaluated completely at the remote database can only be partially evaluated at the remote database when it is rewritten. Its pushdownability is now decreased after being rewritten (step 406 and 408). The UNDO operation is now called to change the query back to its original form (step 410). This way, we give the Optimizer phase 324 the original query portion and it will generate alternatives to consider the evaluation of the IN predicate at the remote database or at the local database. Since IN is a filtering predicate, executing this predicate remotely is usually better than executing the predicate locally because it reduces the amount of data that has to be sent over the network Transforming Subquery into JOIN. This example illustrates a situation when the pushdownability is unchanged due to rewriting a portion of the query and the rule ACTION is taken in order to receive the benefit of the rule. Given a query that determines employees that belong in departments wherein the department has at least one project, according to SQL query below:

SELECT x.empno
      FROM Employee x
      WHERE EXISTS(SELECT projno
        FROM Project y
        WHERE x.deptno=y.deptno)

Note that Employee table and the Project table exist on the same remote database and assume that the remote database system can fully evaluate this operation. The traditional "Transforming Subquery into JOIN" rewrite rule rewrites the above query into the following form:

SELECT DISTINCT x.empno
      FROM Employee x, Project y
      WHERE x.deptno=y.deptno This transformation is good in general because the JOIN between Employee x and Project y gives the optimizer two alternatives instead of one alternative for evaluating the query. The optimizer may evaluate the statement by: (1) choosing x as outer, y as inner, and for each row of x, use scan to get matching rows from y, or (2) choosing y as outer, x as inner, and for each row of y, use scan to get matching rows from x. Now, the rewritten query is still pushdownable to the remote database system, thereby allowing the full benefit of the rule without any decrease in pushdownability.

Transforming OUTER JOIN to JOIN. Consider the situation where a query first determines employees and associated projects where the employee's deptno does or does not match the project's deptno. Next, the query returns in the results only those matching with project of name 'Datajoiner'. The SQL statement for such a query is found below:

SELECT
      FROM Employee x LEFT OUTER JOIN Project y on
        x.deptno=y.deptno
      WHERE y.projname='Datajoiner'

Assume the above query can not be completely evaluated at remote database system A 208 since it does not support LEFT OUTER JOIN. The traditional "Transforming OUTER JOIN into JOIN" rewrite rule rewrites the above query into the following form:

SELECT *
      FROM Employee x, Project y
      WHERE x.deptno=y.deptno and y.projname=
        'Datajoiner'

This transformation is good in general because the JOIN between Employee x and Project y gives the optimizer two alternatives instead of one alternative for evaluating the query. The alternatives that the optimizer now has to choose from are: (1) Choose x as outer, y as inner, and for each row of x, use scan to get matching rows from y that satisfies y.projname='DataJoiner'; or (2) Choose y as outer, x as inner, and for each row of y that satisfies y.projname= 'DataJoiner', use scan to get matching rows from x.

Besides having two choices during optimization, in this case, the rewritten query becomes completely pushdownable to the remote database system A 208 due to the lack of OUTER JOIN. This allows receiving the benefit of the rule (e.g., more choices for the optimizer) and at the same time achieving increased pushdownability to the remote database systems than without the rule.

By taking into account pushdownability at the Query Rewrite phase 316, new rules can be conceived that will enhance system performance in a heterogeneous database environment. These new rules attempt to minimize the number of remote queries, maximize the portions of the query that can be pushed down remotely, and give the Optimizer phase 324 the maximum number of choices to explore in search of the optimal query plan.

Grouping UNION operations based on data sources. Given a query which finds out the union set of the deptno from the Employee table, the deptno from Department table, and the deptno from Project table in the following SQL query:

SELECT x.deptno
      FROM Employee x
    UNION
    SELECT y.deptno
      FROM Department y
    UNION
    SELECT z.deptno
      FROM Project z The query as it is written above is neither pushdownable to the remote database system A 208 or to the remote database system B 212. However, we try to maximize the portions of the query that can be pushed down to the remote databases and limit the search space of the Optimizer phase 324 heuristically. In other words, the Optimizer phase 324 communicates with a remote database system as few times as possible while simultaneously pushing down as much of the query as possible to the remote database systems. The operands of the UNION operator are grouped based on their data sources so that the above query can be rewritten by an appropriate rule as follows:

(SELECT x.deptno FROM Employee x
      UNION
      SELECT z.deptno FROM Project z)
    UNION
    SELECT y.deptno
      FROM Department y To get the final results, we execute two remote SQL statements:

(1) SELECT x.deptno FROM Employee x
    UNION

SELECT z.deptno FROM Project z;
(2) SELECT y.deptno FROM Department y

Plugging scalar subquery result into a remote SQL statement. Given a query which finds out employees who belong to the department with the highest department number among the departments having a department name of 'Service' as described below:

```
SELECT x.empno
    FROM Employee x
    WHERE x.deptno=(SELECT MAX(y.deptno)
        FROM Department y
        WHERE y.deptname='Service')
```

The above query is not completely pushdownable to either remote database system A 208 or remote database system B 212. If this query were to be optimized in a naive manner, the Employee table would be fetched from the remote database in its entirety and the scalar subquery predicate would be applied locally. However, assuming that remote database system A 208 supports host variables, we can maximize the portions of the query that can be pushed down to the remote database systems and pushdown the scalar subquery predicate to the relevant remote database system. First, determine the results of the scalar subquery by sending a remote SQL statement to the remote database system B 212 as shown below:

```
SELECT MAX(y.deptno)
    FROM Department y
    WHERE y.deptname='Service'
```

Next, the predicate is pushed down to remote database system A 208 by plugging the scalar subquery result into remote SQL statement with a host variable, as shown below:

```
SELECT x.empno
    FROM Employee x
    WHERE x.deptno=:hv
```

Twinning complex operators. Several complex SQL operators such as INTERSECT, EXCEPT, FULL OUTER JOIN, CUBE, and ROLLUP are usually implemented locally by rewriting the operator into a series of simpler operators for execution. This is due to the lack of direct run time implementation at the local database for these complex operations. Since some remote database systems may support the complex operators directly in their original form, the Optimizer phase 324 should consider both possibilities. Therefore, the original form of the query and the simplified version are kept in the QGM so that the portion of the query is said to be "twinned."

For example, assuming that the remote database system A 208 supports the rollup operator a query that determines projects grouped by rollup(projname, projno, deptno), as shown below, can be twinned.

```
SELECT *
    FROM Project x
    GROUP BY ROLLUP(x.projname, x.projno, x.deptno)
```

Even though the query is completely pushdownable as written to the remote database system A 208, the query rewrite rule will rewrite it due to the lack of direct run time implementation of the ROLLUP operator available locally as shown below:

```
WITH (SELECT projname, projno, deptno
    FROM Project
    GROUP BY deptno, projno, projname)
AS X(C1, C2, C3)
SELECT X.C1, X.C2, X,C3 FROM X
UNION All
    WITH (SELECT X.C1, X.C2, NULL
        FROM X
        GROUP BY X.C2, X.C1)
    AS Y(C1, C2, C3)
    SELECT Y.C1, Y.C2, Y.C3 FROM Y
    UNION ALL
        WITH (SELECT Y.C1, NULL, NULL
            FROM Y
            GROUP BY Y.C1)
        AS Z(C1, C2, C3)
        SELECT Z.C1, Z.C2, Z.C3 FROM Z
        UNION ALL
        SELECT NULL, NULL, NULL FROM Z
```

In order to let the Optimizer phase 324 have as many opportunities as possible, we keep both the original query as well as its rewritten version. This way the Optimizer phase 324 can select from the following choices:

1) Evaluate the original query as it is written at the remote database system because it is originally pushdownable;
2) Evaluate the rewritten query as it is rewritten at the remote database system if the rewritten portions are still pushdownable;
3) Evaluate some of the rewritten query remotely, some locally.

Typically, the more choices or avenues of approach the Optimizer phase 324 can take, the higher quality or more optimal final query plan is selected. The operation of the Optimizer phase 324 is explained in greater detail hereafter.

Referring back to FIG. 3 and the representation of query processing, a Optimizer Setup phase 320 performs a static pushdown analysis by invoking the code in the Pushdown Analysis module 308 in "static" mode as represented by arrow 322. Essentially, the QGM is traversed once beginning at the bottom of the representation and going up in order to determine which portions of the query can be unambiguously (i.e., regardless of plan enumeration) be performed at a remote database system. The processing steps taken by the Optimizer Setup phase 320 is the traditional extent of pushdown analysis taken by many current heterogeneous database systems. It is by nature conservative and will only identify a portion of a query as pushdownable if it will in fact be pushed down regardless of the different query plans that may be generated during the Optimizer phase 324.

Since a static pushdown analysis was performed previously by the Static Pushdown Analysis phase 306 and maintained by the Query Rewrite phase 316 as individually applied rules changed the pushdownability of the query, the Optimizer Setup phase 320 performs a redundant pushdown analysis to assure that nothing was missed. Note that some implementations may have high enough confidence in the maintenence performed by the Query Rewrite phase 316 that this redundant pushdown analysis may be omitted. The Optimizer Setup phase 320 also prepares the QGM for processing by the Optimizer module 324. Some of this processing includes: (1) splitting non-pushdownable order by or distinct requirements from a pushdownable operation, and (2) assuring that the QGM satisfies the specific implementation requirements of the Optimizer phase 324.

Next, query processing is handled by the Optimizer phase 324 that will generate a number of different query plans and select the optimal plan for actual execution. This is generally done by generating portions of a query plan and combining the portions in various ways to create "final" plans that will execute the entire query.

These final plans and the underlying portions of the plan may be built, manipulated, and stored in a variety of ways as will be understood by those skilled in the art. For example, they can be built in a bottom-up tree-like fashion where the plans could be generated, retained for an optimizer to combine and "explore" until all final plans are found. Then the best final plan will be chosen. Despite the wide variety of query optimiztion, it can be generally said that most query optimizers, including the one used in this embodiment or those available for different database systems, will generate plan portions and combine them in some fashion to arrive at final plans on the way to developing the optimal or "best" plan.

Final query plans or portions of query plans are evaluated on the cost of execution according to a cost model that has a major objective of delivering up the results of the query in the quickest way possible, though other objectives may be used, such as least compute intensive, least network intensive, etc. Things contributing to cost include: CPU speed, I/O speed, network traffic, etc.

In one embodiment, the details of how this is done is described in Gassner cited previously. The plan is "built" from the bottom up as the optimizer explores, according to internal rules and the state of the different permutations of the plans.

Referring now to FIG. 5, the processing steps taken to integrate pushdownability into normal query optimization processing is shown. The Optimizer phase 324 will generate a portion of a query plan at step 500. This is according to it's standard processing explained previously.

The Optimizer phase 324 will continue processing and generate and store the cost parameters for that portion of the query plan based on local execution and store the portion as a candidate to be used for further processing to arrive at final query plans at step 502.

At step 504, an evaluation of the pushdownability of the query plan portion is made by having the Optimizer phase 324 invoking the Pushdown Analysis module 308 as indicated by arrow 326. The Pushdown Analysis module 308 is adapted to analyzing portions of a query and makes reference to locally stored information (e.g., stored by the local database system 204) regarding the capabilities of the remote database systems. Essentially, the Pushdown Analysis module 308 returns whether or not the portion is pushdownable and if so what those pushdownable entities would be (i.e., host variable support, expressions, predicates, SQL operations, etc. at the remote system).

After the Pushdown Analysis module 308 determines pushdownability, and if the portion is not pushdownable, the Optimizer phase 324 will continue processing and generate the next portion of a query plan at step 500. Again this is according to general workings of the Optimizer module 324.

If the Pushdown Analysis module 308 determines that the portion of the plan is pushdownable at step 504, it will further create a duplicate portion of the plan and mark it as pushdownable at step 506. This will be yet another option for the Optimizer phase 324 to evaluate as it determines the optimal plan.

Finally, at step 508, the Optimizer phase 324 continues its processing and will generate the cost parameters for the duplicate portion of the query plan based on remote execution ("pushdowned") and store the duplicate portion as a candidate to be used for further processing to arrive at final query plans. Processing then continues to generate the next portion of the query plan at step 500.

Note that FIG. 5 is a logical diagram and that actual implementation details may dictate variations in actual flow which will be readily understood by those skilled in the art. For example, the local plan generation may occur after the decision regarding pushdownability. Also, remote query plan generation may occur separately from the generation of the local query plan.

Because unambiguously pushdownable elements of the query plan were handled by the static pushdown analysis in the Optimizer Setup phase 320 previously, there will not be a duplication of pushdown analysis. However, the static approach of checking and indicating various portions of the query that can be executed at the remote database system sometimes cannot accurately capture the portions of the query that are really pushdownable because some of the pushdownabilities are dependent upon how the query is planned for execution. In other words, those situations where pushdownability is independant of plan enumeration will have been caught previously during the Optimizer Setup phase 320. The Optimizer phase 324, according to the steps shown in FIG. 5, is able to explore those situations where the pushdownability is dependant on plan enumeration.

In order to illustrate the benefits of the latter (where it is uncertain whether the portion of the query is pushdownable or not depending on the plan enumeration), a number of example are now presented using the same schema as used previously, namely: Employee(empname, empno, deptno) representing an employee having a name, a number, and an associated department number and further having a unique index on empno; Project(prjname, projno, deptno) representing a project having a name, a number, and an associated department number; and Department(deptname, deptno, mgrno) representing a department having a name, a number, and an associated manager number. Again, the Employee table and the Project table will be on remote database system A 208 on server A 206, and the Department table will be on remote database system B 212 on server B 210.

Simple Example. Now, consider a query that will find all employees who work in some department, as described below in an SQL query:

SELECT *
   FROM Employee x,Department y
   WHERE x.deptno=y.deptno.

Referring now to FIGS. 6 and 7, a number of logical partial and final query plans are shown (FIG. 7) and the corresponding portions of plans (FIG. 6) that may be generated by the Optimizer phase 324. However, depending on the capabilities of the underlying remote database systems involved and the context at which the optimization takes place, some of the plans are feasible and others are not.

For one portion of the original query, all rows of the Employee table x could be retrieved from the remote database system A 208 for use in the JOIN operation on the local database system 204 as represented by box 600. This would likely be a costly way of processing the query if there are other alternatives due to the potentially large amount of data traveling between the database systems. If processing indicated that there was host variable support on remote database system A 208, then, depending on the context of the optimization, the Optimizer component 324 may create a pushdowned version (e.g., at step 506 explained previously) with a predicate using a host variable as represented by box 602.

Similarly, all rows of the Department table y could be retrieved from the remote database system B 212 for use in the JOIN operation as represented by box 604 and, again depending on the context of the optimization and the availability of host variable support at the remote database system, the Optimizer component 324 may create a pushdowned version (e.g., at step 506 explained previously) with a predicate using a host variable as represented by box 606.

Referring to the four query plan graphs in FIG. 7, all of the possible permutations conceivable are shown. The query plan graphs representing final query plans shown in FIGS.

7(a)–7(d) could be generated depending on the underlying capabilities of the remote database systems and the context of the compiler generating the query plans.

Figure 7A:
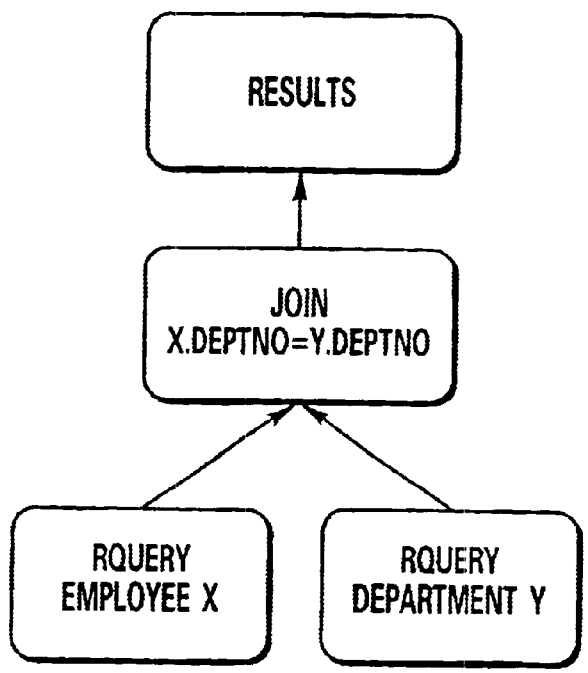
FIG. 7 is a logical diagram representing a set of final query plans that can be generated using the portions shown in FIG. 6.
Figure 7B:
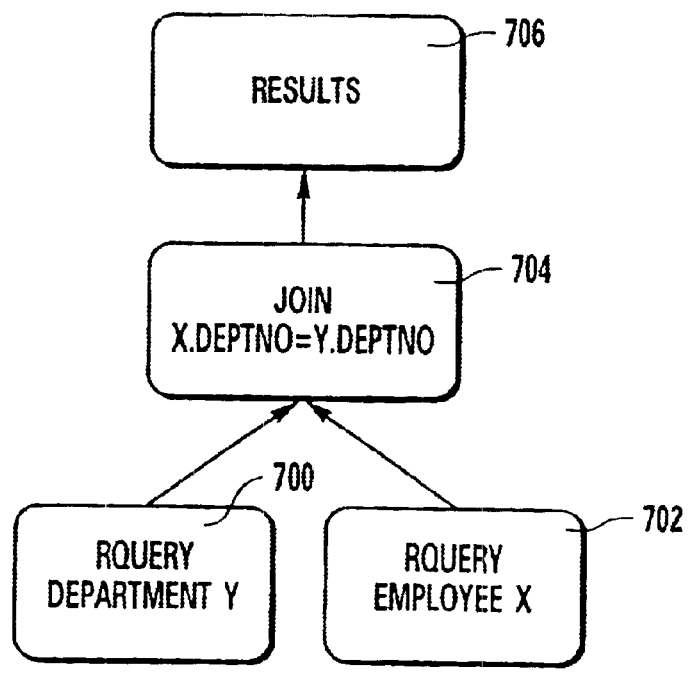

Without taking into account the plan dependant pushdownability at all, an optimizer would generate the final query plans illustrated by the query plan graphs of FIGS. 7(a) and 7(b) because static pushdown analysis will indicate the predicate is not pushdownable for safety. Cost parameters would be calculated for each of the plans and the "best" final plan is chosen for actual execution. Cost parameters can be generated for a portion of the plan during final plan generation and accumulated later or a running total of the most optimal or group of most optimal plans can be maintained.

With a given query, static pushdown analysis will identify portions of query that are unambiguously pushdownable. In other words, regardless of the different plans an optimizer, such as the Optimizer phase 324, may generate, some things, such as a given function will always be pushdownable or not. This is the traditional form of pushdown analysis and is by nature conservative and cannot take advantage of the context known to the optimizer during plan generation. As such, it will miss opportunities for optimal plans.

Assuming that the query plan illustrated in FIG. 7(b) is executed, its operation would require, first, issuing an SQL statement to remote database system B 212 to retrieve rows of the Department table y, as shown below (step 700 in FIG. 7(b)):

SELECT *
FROM Department y

Next, for each row of y, the local database system 204 would issue an SQL statement to remote database system A 208 to retrieve rows of the Employee table x, as shown below (step 702):

SELECT*
FROM Employee x

Finally, the local database system 204 evaluates the predicate x.deptno=y.deptno locally (step 704) to join the appropriate rows and return the results (step 706).

The query plan illustrated in FIG. 7(a) would be evaluated in a similar to that of the query plan illustrated in 7(b) and explained previously except the processing order would be reversed as to Employee table x and Department table y in that the Employee table x would be evaluated as "outer" and the Department table y would be evaluated "inner." In either case, the join predicate and the join operation would be evaluated locally on the local database system 204.

When using context sensitive pushdown analysis as illustrated previously, whether the predicate x.deptno=y.deptno is pushdownable or not depends upon how we plan to execute the query and the remote database system capability. For example, the two plans that are conceivable are illustrated by plan graphs shown in FIGS. 7(c) and 7(d).

Assume now, for this example only, that remote database system A 208 supports host variables and remote database system B 212 does not.

Figure 7C:
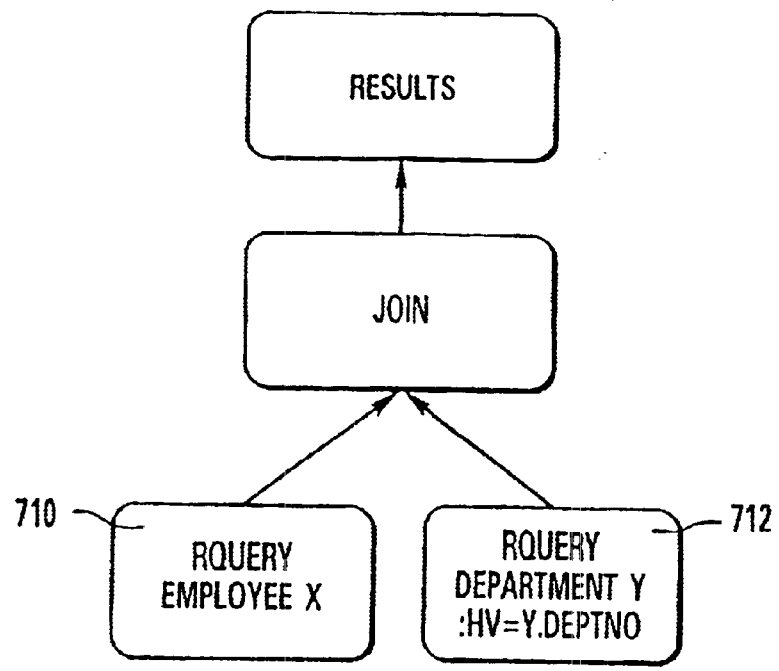

Evaluating the query plan illustrated in FIG. 7(c), its operation would require, first, issuing an SQL statement to remote database system A 208 to retrieve rows of the Employee table x, as shown below (step 710 in FIG. 7(c)):

SELECT *
FROM Employee x

Next, for each row of x, the local database system 204 would issue an SQL statement to remote database system B 212 to make use of host variable capability (step 712). Since remote database B 212 does not support host variables, this plan is not feasible and would not be generated. This will be discovered in one embodiment when the Pushdown Analysis module 308 makes access to the information regarding the remote database system capabilities 312 and would discover that host variables are not supported on remote database system B 212.

Evaluating now the query plan illustrated in FIG. 7(d), its operation would require, first, issuing an SQL statement to remote database system B 212 to retrieve rows of the Department table y, as shown below (step 720 in FIG. 7(d)):

SELECT *
FROM Department y

Next, for each row of y, the local database system 204 would issue an SQL statement to remote database system A 208 that makes use of host variables so that only relevant rows of the Employee table x are returned (i.e., those that have the same department number), as shown below (step 722):

SELECT*
FROM Employee x; x.deptno=:HV

Finally, the local database system 204 locally joins the appropriate rows (step 724) and returns the results (step 726).

Figure 7D:
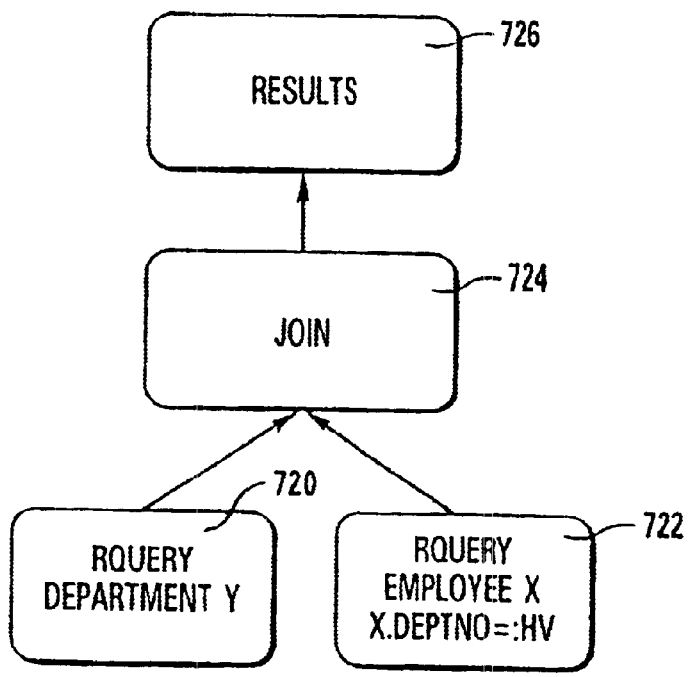

Since the remote database system A 208 does support host variables, the query plan illustrated in FIG. 7(d) is feasible and is likely to be the best alternative. An optimizer, such as Optimizer phase 324, that follows the processing steps explained above in connection with FIG. 5 and takes into account pushdownability during actual plan generation can generate such alternatives.

In general, however, there is an exponential number of combinations that an optimizer, such as Optimizer phase 324 will explore for executing the query. This makes it nearly impossible, and at the least, very impractical to capture all the pushdownable information statically for all the combinations prior to actual plan generation. Therefore, many implementations that do not take into account pushdownability dynamically during plan generation by an optimizer may forego opportunities for efficient query plans. This would result in the selection of the best of the query plans shown in FIGS. 7(a) or 7(b) but would not take into account the likely most optimal plan of FIG. 7(d).

Even assuming that an entire static analysis could be performed on all the different combinations, this would result in a duplication of processing since the actual plan generation would encompass many of the same steps. This, in turn, leads to decreased overall performance in processing the original query.

In summary, before the query optimization by the Optimizer phase 324, we invoke pushdown analysis for plan independent features and save the results. During the dynamic programming of query plan generation and evaluation by the Optimizer phase 324, the optimizer considers the various permutations of the tables and subquery results to be combined along with the predicates that can be applied on the result. This allows for those pushdownabilities that are plan dependent to be evaluated under the specific context being planned.

Unnecessary repetitive computing is avoided by evaluating the pushdownability of plan independent feature, while plan dependent pushdown analysis naturally fits with the query optimizer plan generation architecture and enables the Optimizer phase 324 to obtain more accurate information of the portions of the query that are pushdownable.

Another couple of examples will be helpful to illustrate the benefits of taking into account pushdownability during plan generation by an optimizer, such as Optimizer module 324.

EXAMPLE 1

Consider a query that finds employees and their associated projects. Further, the association is such that the project belongs to the department with the highest number managed by the employee, as represented by the SQL statement below:

SELECT *
  FROM Employee x, Project z
  WHERE z.deptno=(select max(deptno)
    from Department y
    where y.mgrno=x.empno)

Assume for this example only that all the remote database systems (remote database system A 208 and remote database system B 212) support host variables. Without the context information found during actual plan generation, pure static pushdown analysis would indicate that (1) predicate z.deptno=(select max(deptno) from Department y where y.mgrno=x.empno) is not pushdownable for safety because x, y, and z are from different sources (i.e., remote database systems), and (2) predicate y.mgrno=x.empno is not pushdownable for safety because x and y are from different sources. Then the final best plan based on the static pushdownable information that we might get can is illustrated in FIG. 8(*a*).

Figure 8A:
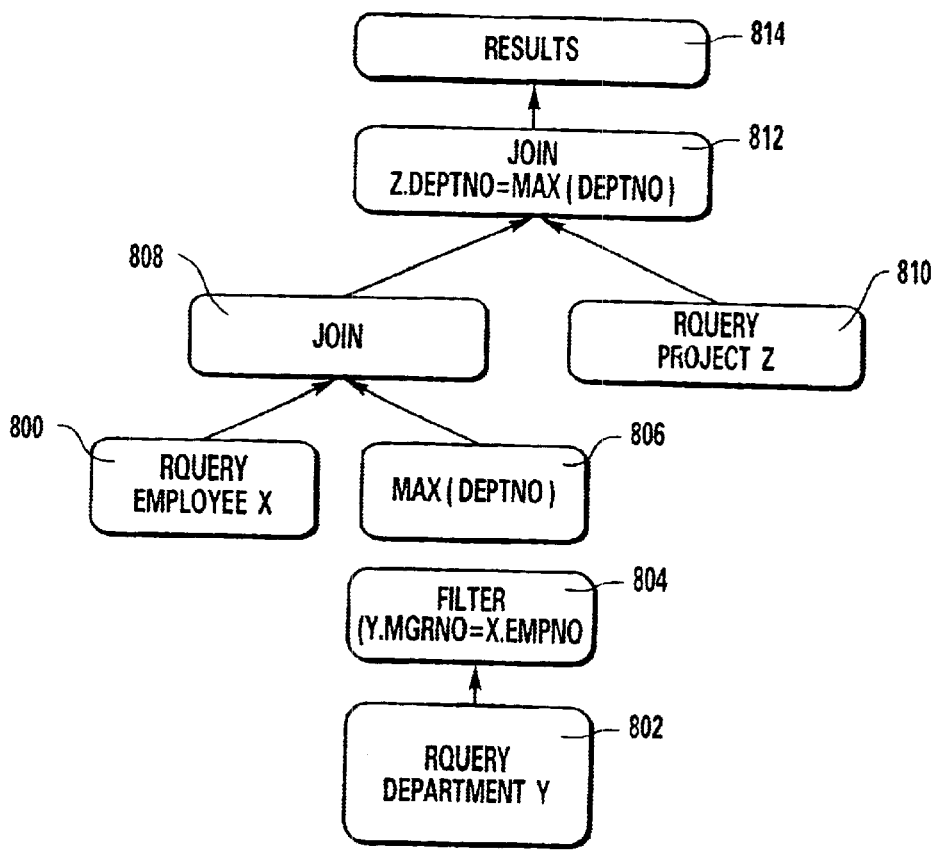
FIG. 8 is a logical diagram representing an example of one final query plan that does not make pushdown analysis during plan enumeration (FIG. 8(a)) and final query plan that generally would be more efficient in a heterogeneous database environment that can be generated by taking into account pushdown analysis during plan enumeration.
Figure 8B:
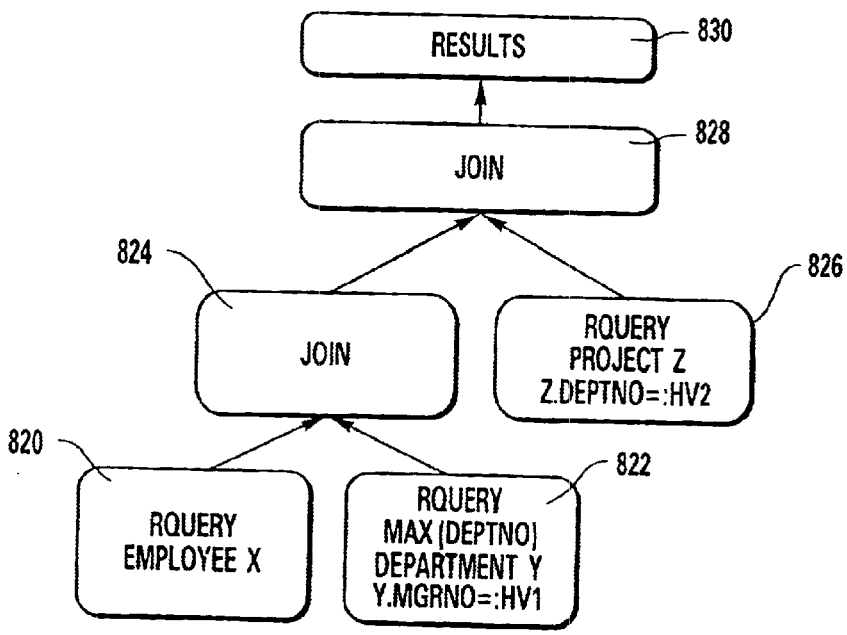

Referring now to the query plan shown in FIG. 8(*a*), the query plan will first cause the local database-system 204 to issue a SQL statement to remote database system A 208 to retrieve rows of Employee table x (step 800 of FIG. 8(*a*)):

SELECT *
  FROM Employee x

Next, for each row of x, the local database system 204 would issue an SQL statement to remote database system B 212 retrieves rows of the Department table y as shown below (step 802):

SELECT deptno
  FROM Department y

The retrieved rows will be filtered using the predicate x.empno=y.mgrno (step 804) and then the highest department number is determined (step 806) locally at the local database system 204.

These rows will be joined (step 808) locally at local database system 204 as an intermediate processing step. As evaluation continues, the local database system 204 issues a SQL statement to remote database system A 208 to retrieve rows of the Project table z (step 810):

SELECT *
  FROM Project z

Finally, the local database system 204 locally joins the appropriate rows from Project table z and the intermediate results (step 812) with the join predicate z.deptno=max(deptno) and returns the results (step 814).

With context information available during actual plan generation, dynamic pushdown analysis would indicates that (1) predicate x.empno=y.mgrno is pushdownable and (2) predicate z.deptno=(select max(deptno) from Department y where y.mgrno=x.empno) is pushdownable under the plan context illustrated in FIG. 8(*b*).

Referring now to the query plan shown in FIG. 8(*b*), the query plan will first cause the local database system 204 to issue a SQL statement to remote database system A 208 to retrieve rows of Employee table x (step 820 of FIG. 8(*b*)):

SELECT *
  FROM Employee x

Next, for each row of x, the local database system 204 would issue an SQL statement to remote database system B 212 that makes use of host variables to retrieve maximum department number (max(y.deptno)) of the Department table y where the employee number taken from the row of x and plugged into the host variable equals the manager number of a relevant row in the Department table y as shown below (step 822):

SELECT MAX(deptno)
  FROM Department y
  WHERE y.mgrno=:hv1

Essentially, the x.empno is bound into remote database system B 212 through a host variable, :hv1. These rows will be joined (step 824) locally at local database system 204 as an intermediate processing step. As evaluation continues, the local database system 204 issues a SQL statement to remote database system A 208 to retrieve rows of the Project table z with a filter predicate (i.e., the intermediate results) as shown below (step 826):

SELECT*
  FROM Project z
  WHERE z.deptno=:hv2

Essentially, the result of max(deptno) is bound into remote database system A 208 through a host variable, :hv2. Finally, the local database system 204 locally joins the appropriate rows from Project table z and the intermediate results (step 828) and returns the results (step 830).

The query plan shown in FIG. 8(*b*) is usually better than the query plan shown in FIG. 8(*a*) because more pushdownability of the predicate is identified dynamically under the plan context. A static pushdown analysis would be unable to catch the use of the first and the second host variable because there would be no context as to how the query would be executed.

EXAMPLE 2

Consider another query that finds employees and their associated projects. Their association is such that the project belongs to the department with the highest number among those departments that include both the employee and the project, as represented by the SQL statement below:

SELECT *
  FROM Employee x, Project y,
    (SELECT MAX(deptno), projno
    FROM Project y
    GROUP BY projno) AS z(deptno,projno)
  WHERE x.deptno=y.deptno and y.deptno=z.deptno Assume for this example only that the SQL dialect on remote database system A 208 does not support nested table expression. Because of this, the entire query cannot be pushed down to remote database system A 208 even though all the tables are on the same remote database system. With static pushdown analysis, it is cost prohibitive to analyze and store the pushdownabilities for all combinations of input tables. Whereas with dynamic pushdown analysis at plan enumeration level, we can try different combinations to avoid using nested table expression, and hence always get more, and potential better plans.

Figure 9A:
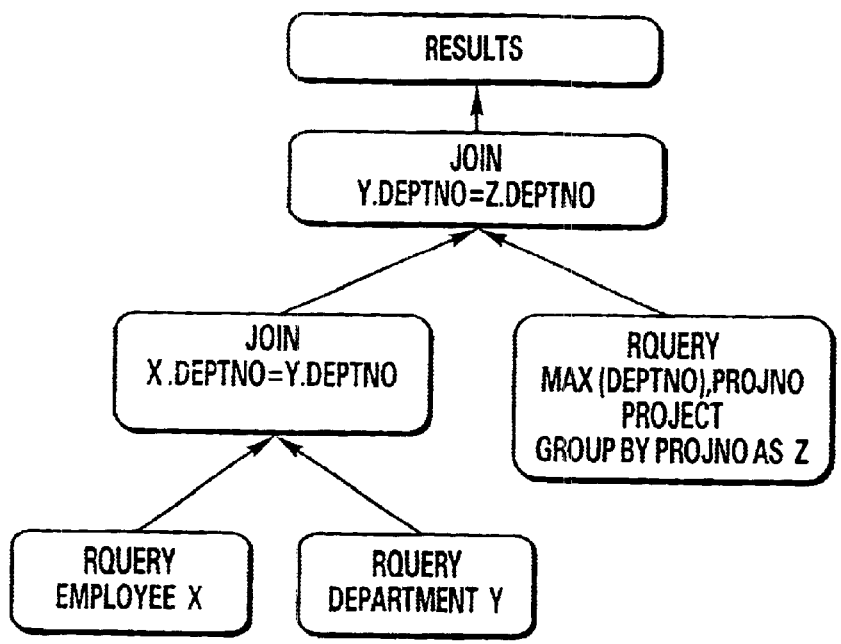
FIG. 9 is a logical diagram representing an example of one final query plan that does not make pushdown analysis during plan enumeration (FIG. 8(a)) and final query plan that generally would be more efficient in a heterogeneous database environment that can be generated by taking into account pushdown analysis during plan enumeration.
Figure 9B:
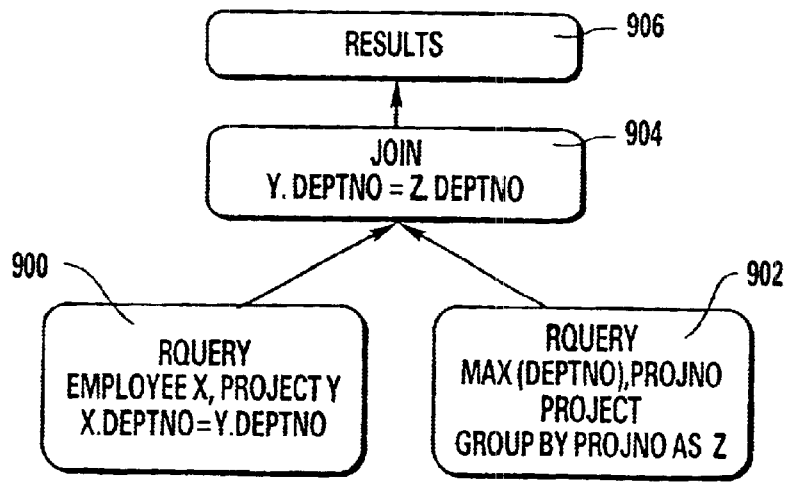

The query plan shown in FIG. 9(*a*) is a plan for the above query that would be generated based on the static pushdown analysis. FIG. 9(*b*) is a plan for the above query that can only be generated based on the dynamic pushdown analysis during plan generation as explained previously in connection with the processing steps shown in FIG. 5. It beneficially allows one more plan alternative for the Optimizer phase 324 to consider in determining the optimal final query plan.

Referring now to the query plan shown in FIG. 9(*b*), the query plan will first cause the local database system 204 to issue a SQL statement to remote database system A 208 to retrieve rows of Employee table x joined with Project table y having common department numbers (step 9090 of FIG. 9(*b*)):

SELECT *
    FROM Employee x, Project y
    WHERE x.deptno=y.deptno

Next, an intermediate result containing the single highest department number for each project number will be retrieved by the local database system 204 according to the remote query issued to the remote database system A 208 shown below (step 902):

SELECT MAX(deptno), projno
    FROM Project
    GROUP BY projno

Finally, the local database system 204 locally joins the appropriate rows from the intermediate results (step 904) and returns the results (step 906).

Referring back to FIG. 3, once an optimal query plan is selecte by the Optimizer phase 324, processing is picked by a Remote SQL Generator phase 328 that generates all the remote SQL statements that will be sent to the various remote database systems. Finally, query processing proceeds to a Threaded Code Generator phase 330 that generates the threaded code that intertwines the remote SQL statements, their results, and all necessary local processing by the local database system 204 so that the processed query that is "compiled" can now be executed and give the desired results back to the requesting client.

To summarize the processing of a heterogeneous query involving tables from multiple remote data sources, an execution plan is selected by a query optimizer, such as Optimizer phase 324, based on a cost model. This execution plan includes two portions: the local portion that is executed locally, and the remote portion that is conveyed by SQL statements that are to be sent to the remote database systems for execution.

The query optimizer should select the remote portion of plan as it does for the local portion of plan through dynamic programming and global cost model which takes cpu, I/O and network communication costs all into account to achieve global optimal plan. The pushdown analysis is first performed statically to avoid repetitive analysis of plan independent pushdownabilities, and then is performed dynamically for each plan context to achieve accurate and context sensitive results allowing the optimizer to explore better plans.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

What is claimed is:

1. A method for query optimization in a heterogeneous database system utilizing pushdown analysis comprising:
    generating a portion of a query plan;
    evaluating the portion of the query plan for pushdownability to a remote database system; and
    if pushdownable to the remote database system, generating cost parameters for said portion of the plan if executed at a local database system and if executed at the remote database system, the cost parameters adapted for use in determining an optimal query plan.

2. A method as recited in claim 1 further comprising, prior to generation of query plans, evaluating the entire query for portions that are pushdownable to one or more remote database systems independent of plan enumeration.

3. A method as recited in claim 1 wherein evaluation of the portion of the query plan for pushdownability occurs at a remote database system.

4. A method as recited in claim 1 wherein evaluation of the portion of the query plan for pushdownability occurs at a local database system.

5. A method as recited in claim 1 wherein evaluation of the portion of the query plan for pushdownability occurs at a local database system and comprises accessing at the local database system information summarizing the capabilities of one or more remote database systems.

6. A method as recited in claim 1 wherein evaluation of the portion of the query plan for pushdownability occurs at a local database system and comprises communicating with one or more remote database systems to determine the capabilities of the remote database systems.

7. A computer program product comprising:
    a computer usable medium; and
    computer readable instructions embodied on said computer useable medium for query optimization in a heterogeneous database system utilizing pushdown analysis, the instructions directing a computer to perform the steps of:
    generating a portion of a query plan;
    evaluating the portion of the query plan for pushdownability to a remote database system; and
    if pushdownable to the remote database system, generating cost parameters for said portion of the plan if executed at a local database system and if executed at the remote database system, the cost parameters adapted for use in determining an optimal query plan.

8. A computer program product as recited in claim 7 further comprising, prior to generation of query plans, evaluating the entire query for portions that are pushdownable to one or more remote database systems independent of plan enumeration.

9. A computer program product as recited in claim 7 wherein evaluation of the portion of the query plan for pushdownability occurs at a remote database system.

10. A computer program product as recited in claim 7 wherein evaluation of the portion of the query plan for pushdownability occurs at a local database system.

11. A computer program product as recited in claim 7 wherein evaluation of the portion of the query plan for pushdownability occurs at a local database system and comprises accessing at the local database system information summarizing the capabilities of one or more remote database systems.

12. A computer program product as recited in claim 7 wherein evaluation of the portion of the query plan for pushdownability occurs at a local database system and comprises communicating with one or more remote database systems to determine the capabilities of the remote database systems.

13. A system for query optimization in a heterogeneous database system utilizing pushdown analysis comprising:

means for generating a portion of a query plan;

means for evaluating the portion of the query plan for pushdownability to a remote database system; and if pushdownable to the remote database system, means for generating cost parameters for said portion of the plan if executed at a local database system and if executed at the remote database system, the cost parameters adapted for use in determining an optimal query plan.

14. A system as recited in claim 13 further comprising, prior to generation of query plans, means for evaluating the entire query for portions that are pushdownable to one or more remote database systems independent of plan enumeration.

15. A system as recited in claim 13 wherein evaluation of the portion of the query plan for pushdownability occurs at a remote database system.

16. A system as recited in claim 13 wherein evaluation of the portion of the query plan for pushdownability occurs at a local database system.

17. A system as recited in claim 13 wherein evaluation of the portion of the query plan for pushdownability occurs at a local database system and comprises means for accessing at the local database system information summarizing the capabilities of one or more remote database systems.

18. A system as recited in claim 13 wherein evaluation of the portion of the query plan for pushdownability occurs at a local database system and comprises means for communicating with one or more remote database systems to determine the capabilities of the remote database systems.

19. A method for query optimization in a heterogeneous database system utilizing pushdown analysis comprising:

processing, at a local system, incoming queries by building portions of a query plan and combining the portions to create final query plans that are assessed to determine the optimal query plan;

while generating each query plan, evaluating a portion of the plan for pushdownability to a remote database system; and if pushdownable to the remote database system, generating cost parameters for said portion of the plan if executed at the local database system and if executed at the remote database system, the cost parameters adapted for use in determining the optimal query plan.

20. A computer program product comprising a computer usable medium having computer-executable instructions embodied therein to perform the method as recited in claim 19.

21. In a query optimization phase that generates a plurality of different query execution plans by building portions of a plan and combining the portions to create final plans that are then assessed to determine the optimal query plan, a method for query optimization utilizing pushdown analysis comprising:

while generating each query plan, evaluating a portion of the plan for pushdownability to a remote system; and if pushdownable the remote database system, generating cost parameters for said portion of the plan if executed at a local database system and if executed at the remote database system, the cost parameters adapted for use in determining the optimal query plan.

22. A computer program product comprising a computer usable medium having computer-executable instructions embodied therein to perform the method as recited in claim 21.

* * * * *